United States Patent [19]
Pürrer et al.

[11] Patent Number: 4,759,172
[45] Date of Patent: Jul. 26, 1988

[54] HAY-MAKING MACHINE

[75] Inventors: Josef Pürrer, Feucht b. Nbg.; Bernhard Kohl, Winkelhaid, both of Fed. Rep. of Germany

[73] Assignee: Fella-Werke GmbH, Feucht, Fed. Rep. of Germany

[21] Appl. No.: 939,925

[22] Filed: Dec. 9, 1986

[30] Foreign Application Priority Data

Dec. 24, 1985 [DE] Fed. Rep. of Germany ....... 3546041

[51] Int. Cl.$^4$ ..................... A01D 34/66; A01D 69/00
[52] U.S. Cl. ............................................ 56/13.6; 56/6
[58] Field of Search ................... 56/6, 13.6, 192, 11.6; 474/265, 242

[56] References Cited
U.S. PATENT DOCUMENTS

| | | | |
|---|---|---|---|
| 1,729,329 | 9/1929 | Chilton | 474/265 |
| 2,539,934 | 1/1951 | Smith et al. | 56/13.6 |
| 2,697,319 | 12/1954 | Porter | 56/13.6 |
| 3,389,539 | 6/1968 | Iwergers | 56/6 |
| 3,443,369 | 5/1969 | Zweegers | 56/6 |
| 3,483,685 | 12/1969 | Gullotin | 56/13.6 |
| 3,550,360 | 12/1970 | van der Lely | 56/6 |
| 3,717,985 | 2/1973 | Freedlander et al. | 56/295 |
| 3,751,889 | 8/1973 | Overesch | 56/13.6 |
| 4,048,790 | 9/1977 | Zweegers | 56/13.6 |
| 4,126,991 | 11/1978 | Gobin | 56/295 |
| 4,183,196 | 1/1980 | Oostepling et al. | 56/13.6 |
| 4,235,069 | 11/1980 | Oosterling et al. | 56/13.6 |
| 4,250,621 | 2/1981 | Houle | 56/295 |
| 4,286,423 | 9/1981 | Caldwell | 56/13.6 |
| 4,300,336 | 11/1981 | Miyata | 56/295 |
| 4,304,088 | 12/1981 | Werner | 56/13.6 |
| 4,327,542 | 8/1982 | van Ginhonen | 56/98 |
| 4,428,181 | 1/1984 | van Staueren et al. | 56/13.6 |

Primary Examiner—Paul J. Hirsch
Attorney, Agent, or Firm—Jordan and Hamburg

[57] ABSTRACT

A hay-making machine, in particular for side-delivery raking, includes a plurality of truncated-cone-shaped rotary devices which are rotatably arranged about an axis which is slightly inclined in relation to a vertical line, the rotary devices being provided with elastic deformable tools and being arranged side-by-side on a supporting arm which slightly ascends in relation to the working surface and which is supported on the ground by a supporting plate and also provided with a joint drive. The supporting arm extends essentially perpendicular to the working direction of the machine and the adjacent rotary devices overlap. A driving pulley at on end of the supporting arm is connected by superimposed V-belts to a respective rotary device, and the V-belts are provided with a band-like widened backside to form a closed working surface.

20 Claims, 2 Drawing Sheets

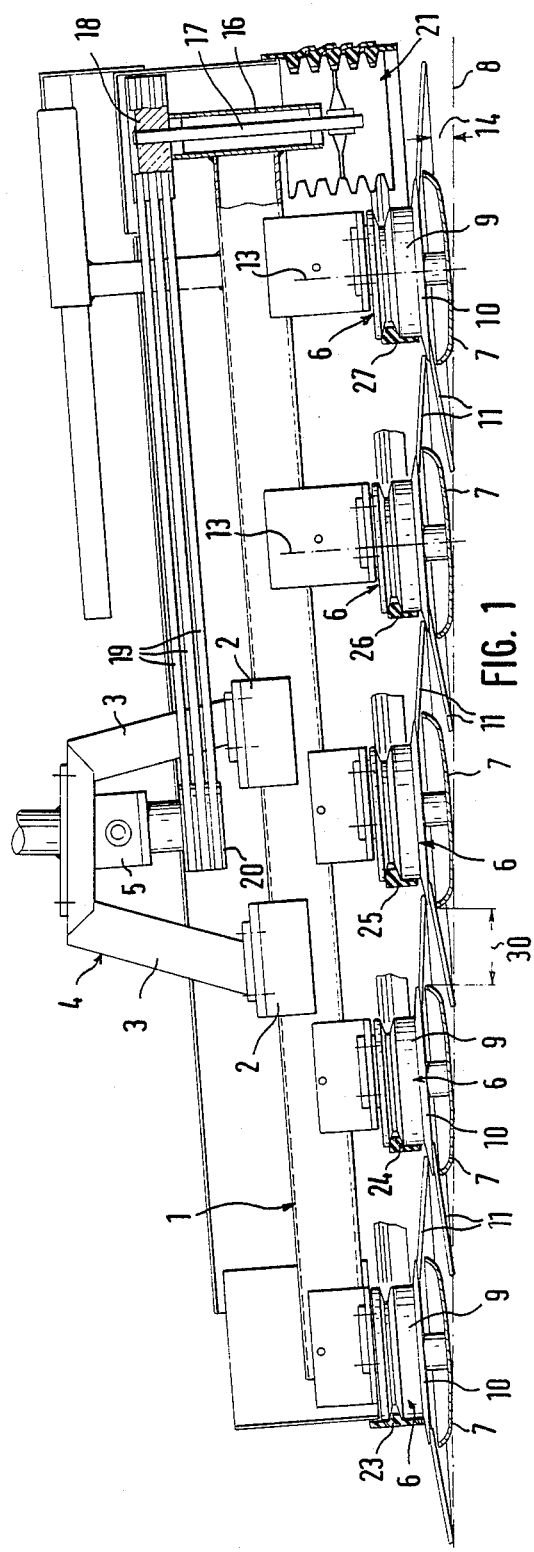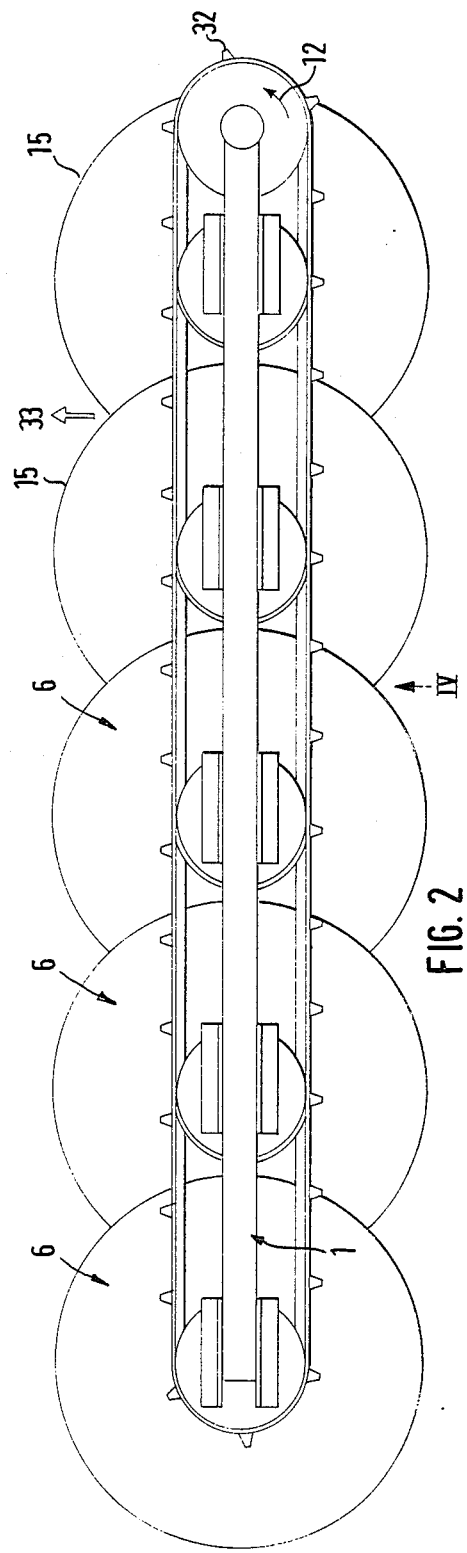

HAY-MAKING MACHINE

BACKGROUND OF THE INVENTION

This invention relates to a hay-making machine, in particular for side-delivery raking, with a plurality of truncated-cone-shaped rotary means which are rotatably arranged about an axis which is slightly inclined in relation to a vertical line, the rotary means being provided with elastic deformable tools which are arranged side-by-side on a supporting arm which is slightly ascending in relation to the working surface and are supported on the ground by a supporting plate and also provided with a joint drive.

Such hay-making machines have multiple uses. In addition to side-delivery raking, they can also be used for side-delivery tedding and for scattering. Prior known designs use multiple revolving forks or prongs for displacing the goods. The former are exposed to an extremely great risk of breaking. Individual broken-off elements enter into the animal feed or into a subsequently following machine, thereby potentially damaging the machine or even injuring the lifestock. These prongs also have an especially aggressive effect on the animal feed to be treated, which is undesirable. Another kind of such a hay-making machine uses one or a plurality of pulleys which are provided at their ends located near the ground with an elastic deformable collar. These pulleys are generally supported side-by-side on a supporting arm extending obliquely to the working direction of the machine, thus resulting in a considerable contruction length which, in particular, in case of frontal attachment, because of the combined construction length of the tractor and the hay-making machine, causes difficulties for transport in traffic. However, it would be most undesirable if the hay-making machine had to be changed over each time before it is transported on a road. The movement circles of the individual pulleys with their collars are tangential which, on the other hand, causes losses in the delivery of the goods to be moved.

An object of the invention is to provide a hay-making machine of the initially mentioned kind which overcomes the disadvantages of the prior known machines and provides a design which ensures a practically loss-free performance, treats the goods as gently as possible and, above all, which does not hinder traffic, thus permitting an especially compact construction.

The basic concept of the invention provides that the supporting arm extends essentially perpendicular to the working direction of the machine, that the adjacent rotary devices overlap one another, and that at one end of the supporting arm there is provided a driving pulley which is connected to each respective rotary device by a superimposed arrangement of V-belts, whereby the backs of the V-belts have a band-like widening and the V-belts which run side-by-side to form a closed surface. The transversal attachment of such an apparatus considerably reduces the construction length with respect to known hay-making machines which, in particular in case of frontal attachment to the tractor, is especially noticeable and, consequently, the tractor with the attached machine can travel on a road or in traffic without reservations. The reduction of the total construction length, furthermore, results in a better adaptation to rugged ground or terrain features, and considerably contributes to the gentle treatment of the goods. However, the overlap between the individual adjacent rotary means is thereby of decisive importance. Consequently, there results an extensively closed working surface for the tools of the rotary means. Especially advantageous has proven to be the characteristic that the parallel superimposed revolving V-belts for the drive of the individual rotary means form an additional working surface, thus further enhancing the movement of the goods.

It is within the scope of the general inventive concept that in such a hay-making machine, the rotary means are provided with respective rotor discs which are provided at the bottom circumference with a rim of individual elastic deformable blades. These blades adapt especially well to the surface to be worked and permit the replacement of individual elements when they become damaged. Furthermore, they are also especially cost-efficient in comparison to a ring collar of known prior art hay-making machines.

The diameter of the rotor disc corresponds approximately to the diameter of the supporting plate of the rotary devices, and there is thereby imparted an extensively reliable support on the surface to be worked.

According to another characteristic of the invention, the extent of overlap of adjacent rotary means corresponds approximately to the distance of the supporting plates thereof. The overlap is determined approximately depending on the radial dimension of the elastic deformable blades. The overlap is favored by the inclination of the axes of the individual rotary means and the slight inclination of the supporting arm on which the rotary means are arranged side-by-side. Thus, none of the individual rotary means are arranged parallel to the ground, but the deformability of the working tools and the sectioning thereof into individual overlapping blades favors a maximum degree of adaptation to the surface to be worked.

It has proven to be especially advantageous that the V-belts of the individual drives of the rotary means overlap one another and, finally, as is furthermore provided according to the invention, that the V-belts are provided at their backside with rib-like or cog-like followers. The movement of the goods is thereby additionally favored in the particular desired way.

Further characteristics, features and advantages of the invention result from the following description of a preferred embodiment of the invention as well as from the accompanying drawings.

BRIEF DESCRIPTION OF THE DRAWINGS

FIG. 1 is a partially cross-sectional rear view of a machine according to one embodiment of the invention;

FIG. 2 is a plan view of the machine in FIG. 1;

DESCRIPTION OF THE PREFERRED EMBODIMENTS

Figure 3:
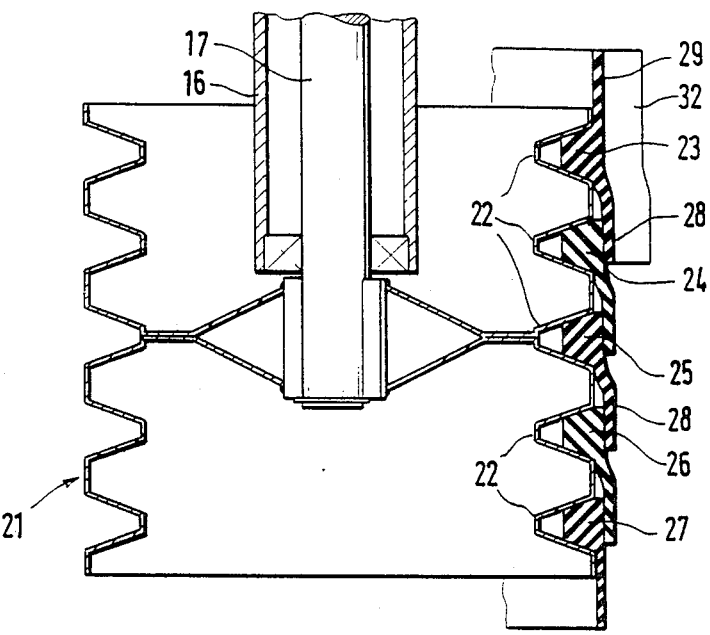
FIG. 3 is a cross-sectional view, on a larger scale, of a detail of the driving pulley.

The machine is provided with a supporting arm 1 which is connected via an angle plate 2 to supports 3 of a bracket 4. The latter serves to suspend the machine on a tractor which is not shown in detail. It also supports a drive coupling 5 on which a trunnion shaft of a tractor acts to thereby drive the drive coupling. On the supporting arm 1 of the illustrated embodiment there are arranged side-by-side five rotary devices 6. Each rotary device 6 is supported by means of a free-running support plate 7 at the level 8. Above the supporting plate 7 is arranged a rotor disc 10 which is connected to a driven belt pulley 9. On the external circumference of this disc 10 are fastened a plurality of blade-like tool elements 11 which overlap in the direction of rotation (arrow 12) of the rotary device 6. The axes of rotation 13 of the rotary device 6 extend slightly inclined to a vertical line. The same angle of inclination 14 applies also to the external circumference 15 of the blade-like working tools 11 of each rotary device 6.

Figure 4:
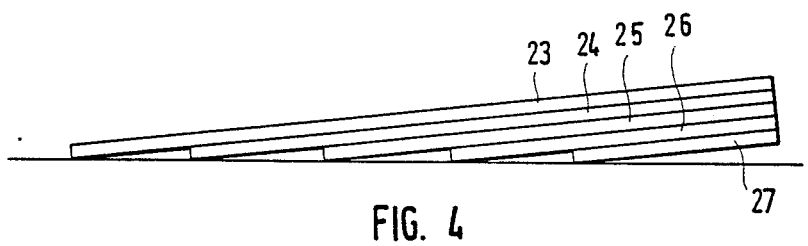
FIG. 4 is a schematic view of the machine looking in the direction of the arrow IV shown in FIG. 2.
Figure 5:
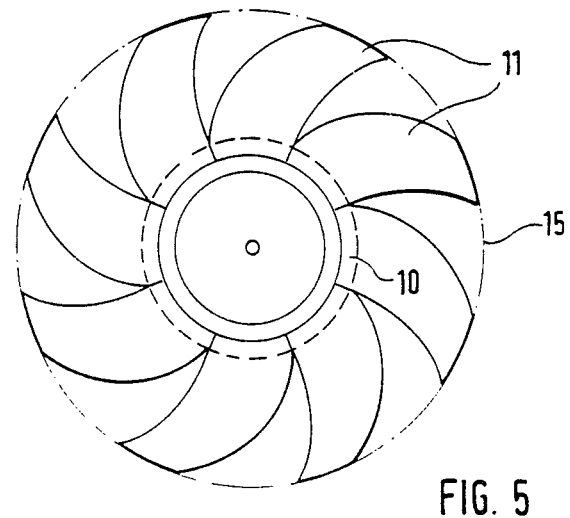
FIG. 5 is a plan view of a rotary means.

At the outer end of the supporting arm 1, in a support column 16, there is supported a shaft 17 which is provided at its upper end with a V-belt pulley 18 which is connected via one of a plurality of V-belts 19 to a corresponding V-belt pulley 20 of the drive coupling 5. At the bottom end of the shaft 17 there is arranged a V-belt pulley 21 which is provided with an equal number of belt grooves 22 as there are rotary devices 6 arranged side-by-side on the supporting arm 1. The axis of the shaft 17 extends parallel to the axes 13 of the individual rotary devices 6. In each groove 22 there is supported a V-belt 23, 24, 25, 26, 27. The V-belt 27 arranged furthest down is assigned to the rotary device 6 positioned closest thereto. Each respectively higher positioned V-belt 26, 25, 24, 23 leads to the respectively closer positioned rotary device 6 arranged on the supporting arm 1. The V-belts 23–27 are provided with a band-like widened backside 28 and each V-belt 23–27 overlaps with its band-like backside the successive V-belt running parallel below it, so that there results a closed working surface, the pattern of which is illustrated in FIG. 4. The upper V-belt 23 can also have a band-like upward extending widening 29 as shown in FIG. 3.

FIGS. 1 and 2 show that the rotor disc 10 and the support plate 7 have approximately the same circumference and that the blade-like working tools 11 extend outwardly essentially by their entire self-supporting length beyond the support plate 7. By approximately this length, which also essentially corresponds to the distance 30 between the support plates 7 of the adjacent rotary means 6, if necessary also by a somewhat greater length than that, the rotary means 6 with the periphery 15 overlap. For this purpose the individual rotary means 6 or the belt pulleys 9 thereof are respectively displacedly arranged on the supporting arm 1 in the upward direction with respect to the supporting arm 1 by the same dimension of the distance of the V-belts 23–27.

In the embodiment illustrated in FIG. 2 the V-belts 23–27 are provided with peripheral cogs 32.

What we claim is:

1. A hay-making machine movable over a working surface, comprising an elongated supporting arm, a plurality of rotary means mounted on said supporting arm in linear array, each of said rotary means comprising a bottom supporting plate, said bottom supporting plates being generally aligned along a plane parallel to said working surface, each of said rotary means further comprising a rotary elastic deformable tool means and a driven pulley for rotating said tool means, each of said rotary means being mounted on said elongated supporting arm such that the axis of each rotary means is perpendicular to said elongated supporting arm, said supporting arm being inclined relative to said working surface such that each of said rotary means has its axis inclined relative to the working surface, said supporting arm being disposed generally perpendicular to the direction of movement of the hay-making machine, and driving means for driving said rotary means, said driving means comprising a driving pulley at one end portion of said supporting arm, said driving pulley having a plurality of pulley grooves, and a plurality of belts drivingly disposed between said plurality of pulley grooves and each of said pulleys on each of said rotary means such that rotation of said drive pulleys simultaneously rotates each of said rotary means.

2. A hay-making machine according to claim 1, wherein said working surface is generally a horizontal surface such that the axis of each of said rotary means is inclined relative to vertical and the longitudinal axis of said elongated supporting arm is inclined relative to horizontal.

3. A hay-making machine according to claim 1, wherein each of said bottom support plates is supported on said working surface.

4. A hay-making machine according to claim 1, wherein said pulleys on each of said rotary means are disposed in variable elevational array relative to said working surface.

5. A hay-making machine according to claim 1, wherein said pulleys on each of said rotary device means are disposed in gradual ascending array as said driving pulley is approached.

6. A hay-making machine according to claim 1, wherein each of said rotary means comprises a rotary disc, said tool means comprising a plurality of individual elastic deformable blades extending from the outer circumference of said rotary disc.

7. A hay-making machine according to claim 6, wherein said bottom supporting plate has a circular configuration with a diameter approximately equal to the diameter of said rotary disc.

8. A hay-making machine according to claim 6, wherein said rotary means are disposed on said supporting arm in linear spaced array, the radial length of said blades being approximately equal to the spacing between two adjacent rotary discs such that the blades of two adjacent rotary means overlap approximately the radial length of the blades.

9. A hay-making machine according to claim 1, wherein said belts are V-belts, each of said V-belts having a different length.

10. A hay-making machine according to claim 1, wherein said belts have an outer lateral extension part.

11. A hay-making machine according to claim 10, wherein said outer lateral extension part overlaps the outer side of an adjacent belt, said extension part thereby covering the spacing between adjacent belts.

12. A hay-making machine according to claim 1, wherein said belts have projecting cogs.

13. A hay-making machine according to claim 1, wherein said driving means further comprising mounting means for mounting said driving pulley on said supporting arm with the axis of the driving pulley being perpendicular to said elongated supporting arm, whereby the axis of said driving pulley is inclined relative to said working surface.

14. A hay-making machine according to claim 1, further comprising operable means mounted on a central portion of said supporting arm and adaptable to be operably connected to a vehicle to move the hay-making machine over said working surface, and operable drive means between said operable means and said driving pulley for driving said driving pulley.

15. A hay-making machine according to claim 14, wherein said operable means is disposed such that the vehicle moves the hay-making machine generally in a direction perpendicular to said elongated support arm.

16. A hay-making machine movable over a working surface, comprising an elongated supporting arm, a plurality of rotary means mounted on said supporting arm in linear array, each of said rotary means comprising a bottom supporting means, said bottom supporting means being generally aligned along a plane parallel to said working surface, each of said rotary means further comprising a tool means and a driven pulley for rotating said tool means, said driven pulleys on each of said rotary means being disposed in variable elevational array relative to said working surface, each of said rotary means being mounted on said elongated supporting arm such that the axis of each of said rotary means is perpendicular to said elongated supporting arm, said supporting arm being inclined relative to said working surface such that each of said rotary means has its axis inclined relative to the working surface, and driving means for driving said rotary means, said driving means comprising a driving pulley at one end portion of said supporting arm, and a plurality of belts disposed at a variable elevational array relative to said working surface drivingly disposed between said driving pulley and each of said driven pulleys on each of said rotary means such that rotation of said driving pulley simultaneously rotates each of said rotary means.

17. A hay-making machine according to claim 16 wherein each of said belts are disposed in a separate general plane of rotation with the plane of rotation of each belt being parallel to one another and with said parallel planes of rotation being inclined relative to said working surface.

18. A hay-making machine according to claim 17 wherein said belt for each rotary means has a different length with said belt lengths progressively decreasing as said driving pulley is approached.

19. A hay-making machine according to claim 16 wherein said inclined supporting arm progressively ascends from said working surface as said driving pulley is approached.

20. A hay-making machine according to claim 16 wherein said driving pulley rotates about an axis which is inclined relative to said working surface.

* * * * *